US010800271B2

(12) United States Patent
Vienken et al.

(10) Patent No.: US 10,800,271 B2
(45) Date of Patent: Oct. 13, 2020

(54) SUPPLY DEVICE FOR A MOTOR VEHICLE

(71) Applicant: Dr. Ing. h.c. F. Porsche Aktiengesellschaft, Stuttgart (DE)

(72) Inventors: Christian Vienken, Vaihingen an der Enz (DE); Dominique Labonte, Karlsruhe (DE); Ulrich Steinhorst, Stuttgart (DE); Marc Thele, Pforzheim (DE); Michael Schumacher, Stuttgart (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 61 days.

(21) Appl. No.: 16/246,672

(22) Filed: Jan. 14, 2019

(65) Prior Publication Data

US 2019/0217725 A1     Jul. 18, 2019

(30) Foreign Application Priority Data

Jan. 17, 2018  (DE) .......................... 10 2018 100 988

(51) Int. Cl.
*B60L 53/10* (2019.01)
*H02J 7/00* (2006.01)
(Continued)

(52) U.S. Cl.
CPC ............ *B60L 53/11* (2019.02); *B60L 50/60* (2019.02); *B60L 58/18* (2019.02); *B60R 16/03* (2013.01);
(Continued)

(58) Field of Classification Search
CPC ........ B60K 6/22; B60L 11/02; B60L 11/1803; B60L 53/11; B60L 58/18; B60L 50/60;
(Continued)

(56) References Cited

U.S. PATENT DOCUMENTS

| 5,558,071 A | 9/1996 | Ward et al. |
| 9,093,908 B2 | 7/2015 | Takegami |

(Continued)

FOREIGN PATENT DOCUMENTS

| DE | 102013219293 A1 | 3/2015 |
| DE | 112015002340 T5 | 2/2017 |

(Continued)

OTHER PUBLICATIONS

Notification of Reason for Rejection for Japanese Application No. 2019-005659, dated Nov. 12, 2019, 5 pages.

*Primary Examiner* — Arnold M Kinkead
(74) *Attorney, Agent, or Firm* — RatnerPrestia

(57) ABSTRACT

A supply device for a motor vehicle has a DC/DC converter and a control device for the DC/DC converter. The DC/DC converter has first terminals and second terminals, which first terminals are configured for electrical connection to a first energy storage or a first energy source and which second terminals are configured for electrical connection to a second energy storage or a load. The DC/DC converter is configured, in a first state to enable a conversion of a first DC voltage at the first terminals into a lower second DC voltage at the second terminals and, in a second state, to carry out no conversion of a first DC voltage at the first terminals into a lower second DC voltage at the second terminals. The control device enables an energy supply at the second terminals by repeatedly changing the DC/DC converter between the first state and the second state.

12 Claims, 2 Drawing Sheets

(51) Int. Cl.
  *H02J 7/34*    (2006.01)
  *B60R 16/03*   (2006.01)
  *B60L 58/18*   (2019.01)
  *B60L 50/60*   (2019.01)

(52) U.S. Cl.
  CPC .............. *H02J 7/00* (2013.01); *H02J 7/0049* (2020.01); *H02J 7/0068* (2013.01); *H02J 7/342* (2020.01); *B60L 2210/10* (2013.01); *H02J 2207/20* (2020.01)

(58) Field of Classification Search
  CPC ......... B60L 2210/10; H02J 5/00; H02J 7/163; H02J 7/0026; H02J 7/0067; H02J 7/00712; H02J 7/007; H02J 7/0069; H02J 7/0068; H02J 7/0049; H02J 7/0048; H02J 2310/46; H02J 7/00; H02J 2207/20; H02J 7/342; H02P 27/08; B60R 16/03
  USPC .... 307/10.1, 24, 80; 320/140, 130, 133, 127
  See application file for complete search history.

(56) References Cited

U.S. PATENT DOCUMENTS

| | | | |
|---|---|---|---|
| 9,868,358 | B2 | 1/2018 | Kono |
| 2001/0011880 | A1 | 8/2001 | James |
| 2012/0200152 | A1 | 8/2012 | Schneider et al. |
| 2012/0292989 | A1 | 11/2012 | Kim et al. |
| 2014/0159478 | A1* | 6/2014 | Ang .......................... H02J 7/35 307/9.1 |
| 2015/0283911 | A1* | 10/2015 | Ambrosio ............... B60L 50/51 307/10.1 |
| 2017/0232851 | A1* | 8/2017 | Unno ..................... B60L 58/24 307/10.1 |

FOREIGN PATENT DOCUMENTS

| | | |
|---|---|---|
| JP | 2013252000 A | 12/2013 |
| JP | 2015012641 A | 1/2015 |
| JP | 2015100169 A | 5/2015 |

\* cited by examiner

SUPPLY DEVICE FOR A MOTOR VEHICLE

CROSS-REFERENCE TO RELATED APPLICATION

This application claims priority to German Patent Application No. DE 10 2018 100 988.7, filed Jan. 17, 2018, which is incorporated by reference herein in its entirety.

FIELD OF THE INVENTION

The invention relates to a supply device for a motor vehicle.

BACKGROUND OF THE INVENTION

DE 10 2013 219 293 A1, which is incorporated by reference herein, discloses a vehicle having a high-voltage on-board electrical system, a low-voltage on-board electrical system and having a DC chopper between these on-board electrical systems. The high-voltage electrical system has a high-voltage energy storage element and the low-voltage electrical system has a low-voltage energy storage element. In a stationary phase, the DC chopper is used to load the low-voltage energy storage element by supplementarily connecting consumers from the high-voltage on-board electrical system and then to evaluate the response of the low-voltage energy storage.

US 2001/0011880 A1 and US 2012/0292989 A1, both of which are incorporated by reference herein, disclose a battery charger having a DC/DC converter.

US 2012/0200152 A1, which is incorporated by reference herein, discloses a charging device for a hybrid vehicle having a DC/DC converter for conversion between a high-voltage electrical system and a low-voltage electrical system.

U.S. Pat. No. 5,558,071, which is incorporated by reference herein, discloses a highly efficient DC/DC converter with a controller.

SUMMARY OF THE INVENTION

According to one aspect of the invention, a supply device for a motor vehicle comprises a DC/DC converter and a control device for the DC/DC converter, which DC/DC converter comprises first terminals and second terminals, which first terminals are configured for electrical connection to a first energy storage or an energy source and which second terminals are configured for electrical connection to a second energy storage or a load, which DC/DC converter is configured, in a first state to enable a conversion of a first DC voltage at the first terminals into a lower second DC voltage at the second terminals and, in a second state, to carry out no conversion of a first DC voltage at the first terminals into a lower second DC voltage at the second terminals, and which control device is configured to enable an energy supply at the second terminals by repeatedly changing the DC/DC converter (20) back and forth between the first state and the second state.

By switching back and forth between the first state and the second state, it is possible to operate the DC/DC converter in an operating range with higher efficiency, and the losses can thus be reduced. This results in an increase in efficiency vis-à-vis a DC/DC converter which always actively carries out a conversion and in so doing operates in an operating range with lower efficiency.

In accordance with one preferred embodiment, the supply device has a voltage controller, which is configured to control the voltage at the second terminals to a predefined setpoint value, and a predefined setpoint value is predefined for the voltage controller in the first state. As a result, a connected second energy storage can be charged with a voltage predefined by the voltage controller.

In accordance with one preferred embodiment, the second terminals are connected to a second energy storage, in particular to a rechargeable battery. The second energy storage can be used as a storage for excess energy during the first state, and this energy can subsequently be emitted in the second state from the second energy storage to a load or a consumer, for example.

In accordance with one preferred embodiment, the changing back and forth between the first state and the second state takes place at a frequency which is lower than 10 Hz, preferably lower than 1 Hz. As a result, in the first state, a high current or a high power can be provided for charging the second energy storage, and, in the second state, the second energy storage can provide the power required for the load, for example. In this case, the frequency can be chosen in fixed fashion, but it can also be chosen depending on the state, in particular depending on the required power or depending on the state of charge of the energy storage.

In accordance with one preferred embodiment, the control device is configured, depending on an instantaneously required electrical power at the second outputs, to determine a suitable ratio of the time duration of the first state and the time duration of the second state and to drive the DC/DC converter accordingly. This adaptation of the time duration makes it possible to operate the DC/DC converter in an advantageous range.

In accordance with one preferred embodiment, the ratio of the time duration of the first state and the time duration of the second state is smaller in the case of a first instantaneously required electrical power than in the case of a second instantaneously required electrical power, which is higher than the first instantaneously required electrical power. This makes possible, in the case of high powers or consumptions, a good current supply and smaller interruptions by the second state.

In accordance with one preferred embodiment, the control device is configured, depending on an instantaneously required electrical power at the second outputs, to determine a suitable period duration for a period from first state and second state and to drive the DC/DC converter accordingly. This makes it possible to operate the DC/DC converter in a particularly advantageous range with good efficiency.

In accordance with one preferred embodiment, the period duration for a period from first state and second state is smaller in the case of a first instantaneously required electrical power than in the case of a second instantaneously required electrical power, which is higher than the first instantaneously required electrical power. What can be achieved as a result is that in the case of the lower first instantaneously required electrical power on the part of the DC/DC converter the pulse duration does not become excessively small.

In accordance with one preferred embodiment, the supply device is connected to a second energy storage and a load connected to the second energy storage, and the instantaneously required electrical power is determined depending on a measurement of a current from the second energy storage to said load. By means of this measurement, it is possible to react very rapidly to a changing load.

In accordance with one preferred embodiment, the supply device is connected to a second second energy storage, and the instantaneously required electrical power is determined depending on a measurement of the voltage at the second energy storage. Integrative effects that are possibly not detected during the measurement of the current from the second energy storage to the load are also taken into account as a result.

In accordance with one preferred embodiment, the supply device is connected to a second energy storage, and the instantaneously required electrical power is determined depending on the state of charge of the second energy storage.

In accordance with one preferred embodiment, the instantaneously required electrical power is determined both depending on a measurement of a current from the second energy storage to the load and depending on a measurement of the voltage at the second energy storage or the state of charge of the second energy storage. By way of example, the higher value or the average value can be used. This results in a faster adaptation of the power. Taking account of the state of charge of the second energy storage and the current to the load is advantageous since a large load and hence a high current to the load can occur even given a sufficient state of charge. Provision of the required power by the DC/DC converter results in a smaller discharge of the second energy storage and conserves the latter.

In accordance with one preferred exemplary embodiment, the DC/DC converter has a predefined first operating point, at which the efficiency is maximal, and the DC/DC converter is operated at the first operating point in the first state.

In accordance with one preferred embodiment, the DC/DC converter in the first state for generating the second DC voltage operates with a clocking, the frequency of which is higher than the frequency of the switchover between the first state and the second state. The switchover between the states Z1 and Z2 would negatively influence the DC/DC conversion with docking on account of the interference if the frequency of the switchover were of similar magnitude to the frequency of the clocking.

In accordance with one preferred embodiment, a motor vehicle has such a supply device. The supply device is particularly well suited to electric vehicles since, in the case of the latter, the energy efficiency is important for the range.

BRIEF DESCRIPTION OF THE DRAWINGS

Further details and advantageous developments of the invention are evident from the exemplary embodiments described below and illustrated in the drawings, which exemplary embodiments should in no way be understood as a restriction of the invention, and also from the dependent claims. In the Figures:

DETAILED DESCRIPTION OF THE INVENTION

Figure 1:
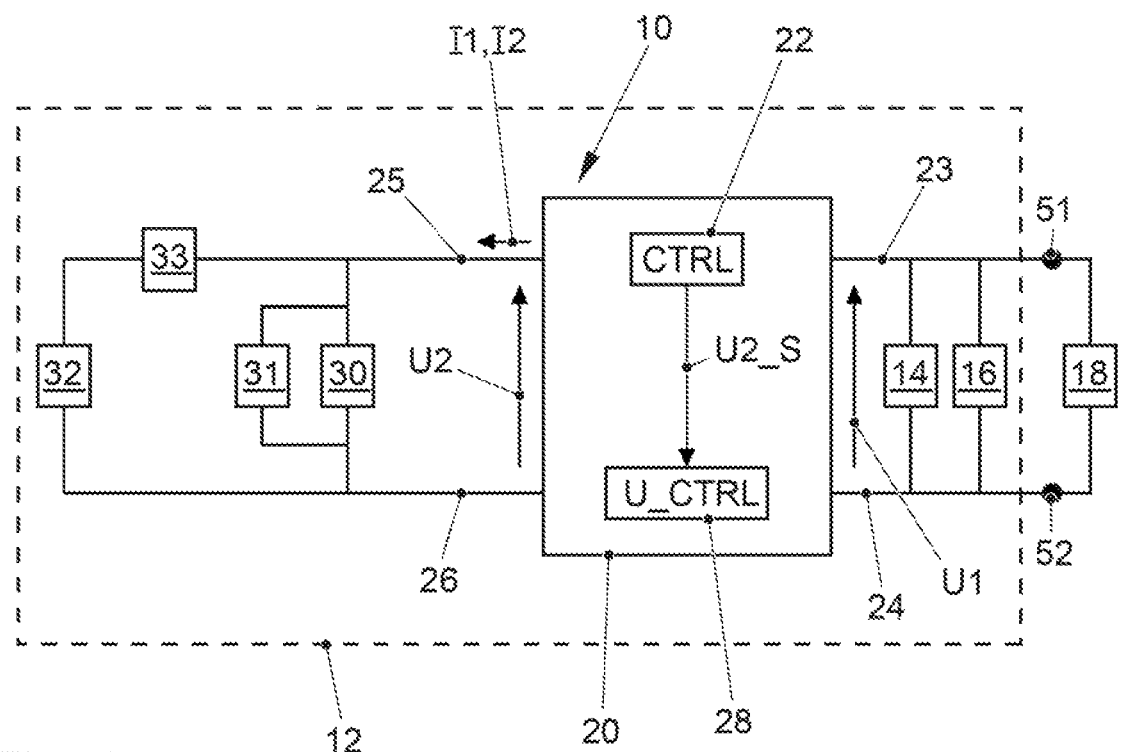
FIG. 1 shows a motor vehicle having a supply device for an energy storage in a schematic illustration.

FIG. 1 shows a motor vehicle 12 in a schematic illustration. The motor vehicle 12 has an energy storage 14 and a load 16 which is connectable to the energy storage 14, wherein the energy storage 14 operates with a first voltage U1, preferably a high voltage of e.g. 200 volts, 400 volts or 800 volts. The motor vehicle 12 has a further energy storage 30 and a load 32 which is connectable to said energy storage 30, wherein the energy storage 30 operates with second voltage U2, which is preferably lower than the first voltage U1. The second terminals 25, 26 are preferably provided for connecting an on-board electrical system. The energy storage 30 preferably has a high efficiency and a high cycle endurance. The second voltage U2 is e.g. 12 volts, 24 volts or 48 volts. A supply device 10 has a control device 22 and a DC/DC converter 20. The DC/DC converter 20 is provided or interconnected between the energy storage 14 and the energy storage 30. The DC/DC converter 20 has first terminals 23, 24 for connection to the energy storage 14 and second terminals 25, 26 for connection to the energy storage 30. The first terminals 23, 24 are preferably connected to terminals 51, 52 for an energy source 18, which energy source is for example a charging station or a domestic electricity terminal. The DC/DC converter 20 can also operate with the energy source 18 in order to carry out the DC/DC conversion.

The DC/DC converter 20 is configured, in a first state Z1, to enable a conversion of the first DC voltage U1 at the first terminals 23, 24 into the lower second DC voltage U2 at the second terminals 25, 26, and, in a second state Z2, to carry out no conversion of the first DC voltage U1 into the lower second DC voltage. As a result, the energy storage 30 can be charged via the DC/DC converter 20, and the energy storage 30 and/or the load 32 can be supplied with energy. The state Z1 can also be referred to as an operating point with high electrical load or power, and the state Z2 as an operating point in the switched-off state.

The control device 22 is designated by CTRL. By means of this control device 22, it is possible for the DC/DC converter 20 to be driven in such a way that charging of the energy storage 30 is made possible by repeatedly changing the DC/DC converter 20 back and forth between the first state Z1 and the second state Z2.

Preferably, the supply device 10 has a voltage controller 28, designated as U_CTRL. The voltage controller 28 is configured to control the voltage U2 at the second terminals 25, 26 to a predefined setpoint value U2_S, and a setpoint value U2_S is preferably predefined for the voltage controller 28 in the first state Z1.

A measuring device 31 is optionally provided at the energy storage 30 in order to measure the voltage at the energy storage 30.

A measuring device 33 is optionally provided in order to measure the current from the energy storage 30 to the load 32.

The measurement signals determined by the measuring devices 31, 33 can be fed to the control device 22 in order that the latter can determine the instantaneously required electrical power or, given approximately constant voltage, synonymously the instantaneously required current from the DC/DC converter 20.

Figure 2:
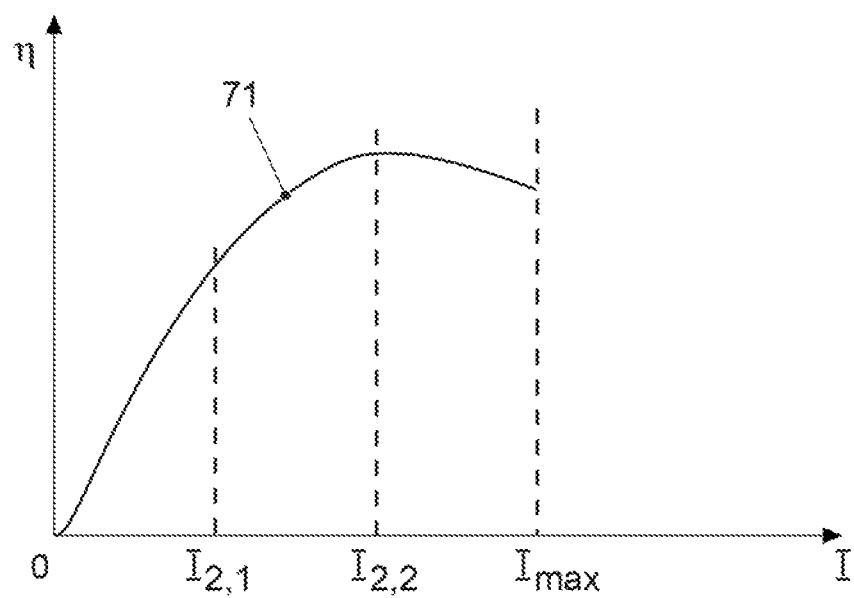
FIG. 2 shows a diagram with the efficiency plotted against the current.

FIG. 2 shows a diagram in which the efficiency of a typical DC/DC converter 20 for different current intensities I is depicted schematically with a line 71. The efficiency η results from the ratio of the electrical power at the second terminals 25, 26 to the electrical power at the first terminals 23, 24 and is a maximum of 1. The currents I1, I2 are depicted by way of example at the terminal 25 in FIG. 1 and are proportional to the electrical power given constant voltage U2. It is evident that the DC/DC converter 20 has a lower efficiency η in the case of a smaller current I2,1 by comparison with a higher current I2,2. In the case of the current I2,2, the efficiency η has a maximum, and it is advantageous to operate the DC/DC converter 20 with the current I2,2 or at this operating point in the first state Z1. It is generally advantageous to operate the DC/DC converter as far as possible with high currents or high electrical power. The diagram of the efficiency η is dependent on the DC/DC converter 20 used. The low efficiency η in the case of low power of the DC/DC converter 20 is typical of many such converters, however. Examples of suitable DC/DC converters are split-pi converters (referred to as: boost-buck converters), cascaded buck-booster converters, buck converters and single-ended forward converters. These DC/DC converters operate in part with a clocking of at least one switch of the DC/DC converter 20. The frequency of this clocking is preferably above 20 kHz in order to reduce disturbing noises. In this case, the frequency of the clocking in the DC/DC converter is preferably significantly greater than the frequency of the switchover between the first state Z1 and the second state Z2.

Figure 3:
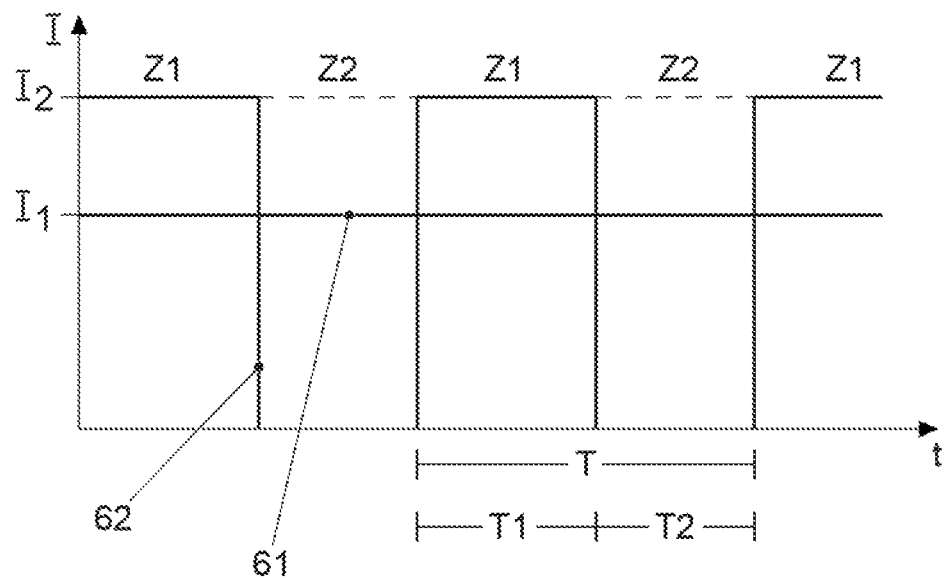
FIG. 3 shows an illustration of the change between two states of a DC/DC converter.

FIG. 3 shows the current I1 and I2, respectively, that is measurable at the second terminals 25 or 26 of the DC/DC converter. The current I1 corresponds to a persistent state Z1 of the DC/DC converter 20, which is chosen e.g. depending on the present power demand of the load 32 in order to reduce or entirely prevent a discharge of the energy storage 30. In the case where the state Z1 is chosen as a persistent state, the current I1 is possibly relatively small, and the DC/DC converter thus operates with a relatively lower and thus poorer efficiency. As an alternative to a continuous energization corresponding to the line 61, a clocked or pulsed energization corresponding to the line 62 can be effected, which involves repeatedly changing back and forth between the first state Z1 and the second state Z2. In order to bring about a corresponding energy feed to the energy storage 30 and/or to the load 32, the magnitude of the current I2 during the state Z1 must be higher than in the case of a continuous energization. This makes it possible to operate the DC/DC converter 20 with a better efficiency and thus to reduce losses.

The changing back and forth between the first state Z1 and the second state Z2 is preferably carried out at a frequency which is lower than 10 Hz, preferably lower than 1 Hz. The period duration T is 0.1 second at a frequency of 10 Hz and 1 second at a frequency of 1 Hz. In the case of a very small load 32, larger period durations T are possible, e.g. 10 seconds, 30 seconds, 60 seconds or 60 minutes. The period duration can alternatively or additionally be influenced depending on the state of charge of the energy storage 30. During the state Z1, the entire energy is not usually fed to the load 32, rather the energy storage 30 acts as a buffer and takes up the energy at least in part. During the state Z2, the energy storage 30 can subsequently emit the energy again and feed it to the load 32.

The ratio of the time duration T1 of the first state 21 and the time duration T2 of the second state Z2 is preferably determined by the control device 22 on the basis of the instantaneously required electrical power at the second outputs 25, 26. This can be carried out e.g. by measurement of the current to the load 32, or it is possible to measure the present voltage at the energy storage 30, which reflects the state of charge of the energy storage 30 and thus the required power. In the case of energy storages 30 with assigned state of charge determination, which determine a value characterizing the state of charge, the instantaneously required power at the second outputs 25, 26 can preferably be determined depending on the value characterizing the state of charge of the energy storage 30. The state of charge is preferably kept in a predefined window having a lower limit and an upper limit, wherein the power feed is switched on if the lower limit is reached, and the power feed is ended again if the upper limit is reached. This leads to fewer charging cycles and to a longer lifetime of the energy storage. This is referred to as so-called SOC-guided control (SOC=state of charge).

Upon consideration of the lines 61 and 62 in FIG. 3, the integral of the line 61 over time t should correspond to the integral of the line 62 over time t in order to feed the same energy.

Preferably, the control device 22 is configured to determine the period duration T on the basis of the instantaneously required electrical power and to drive the DC/DC converter 20 accordingly. In this regard, it may be advantageous, in the case of a high required power, to change back and forth between the states Z1 and Z2 more often than in the case of only a low power, in the case of which a power feed has to be effected only infrequently.

Figure 4:
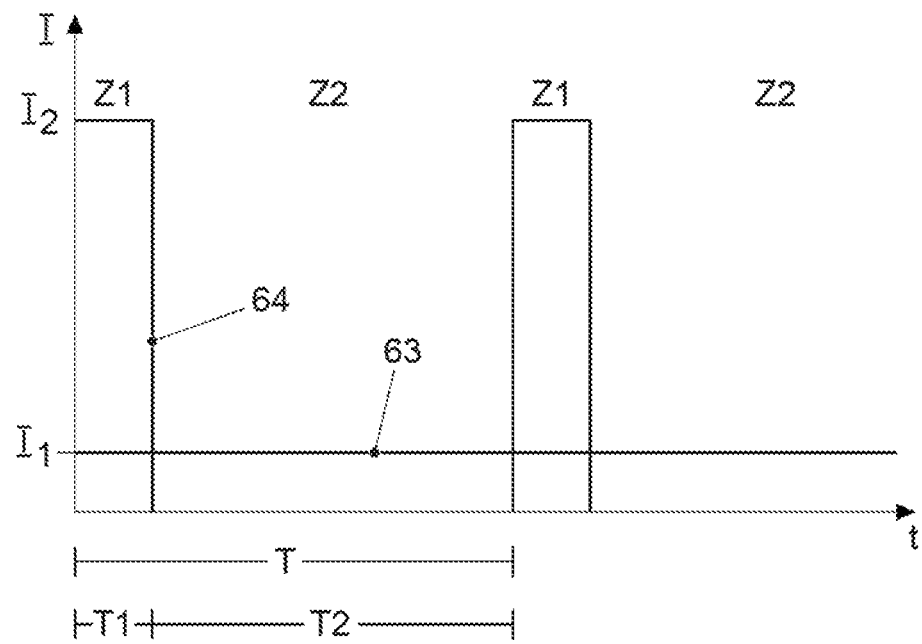
FIG. 4 shows a further illustration of the change between two states of a DC/DC converter.

FIG. 4 shows a second exemplary embodiment for the change between the states Z1 and Z2, cf. line 64, and a constant energization with the line 63. In this exemplary embodiment, only a low current intensity I1 is required in the case of a continuous energization 63. In order to achieve a corresponding energy feed with the docked energization 64, short pulses are required, and the DC/DC converter 20 is subsequently operated in the state Z2 for a relatively longer time duration T2. In comparison with the diagram in FIG. 3, it is evident that in FIG. 4, in the case of the lower required current intensity or power, preferably the period duration is greater and the ratio of the time duration T1 to the time duration T2 is smaller. The increase in the period duration is positive since otherwise a very short time duration T1 would be available for the state Z1, and this would lead to unnecessary switching losses.

Diverse alterations and modifications are naturally possible in the context of the present invention.

LIST OF REFERENCE SIGNS

10 Supply device
12 Motor vehicle
14 Energy storage
16 Load
18 Energy source
20 DC/DC converter
22 Control device
23, 24 First terminals
25, 26 Second terminals
28 Voltage controller
30 Energy storage
31 Measuring device for a voltage
32 Load
33 Measuring device for a current
51, 52 Terminals for energy source
61, 62 Lines in diagram
63, 64 Lines in diagram
71 Line for efficiency
I1 Current with constant charge
I2 Current with pulsed charge
T1 Pulse duration
T2 Interpulse period duration
T Duration of a period of a pulse and an interpulse period
U1 High voltage
U2 Low voltage Z1 First state
Z2 Second state

What is claimed is:

1. A supply device for a motor vehicle, said supply device comprising:
   a DC/DC converter including first terminals and second terminals, which first terminals are configured for electrical connection to a first energy storage or an energy source and which second terminals are configured for electrical connection to a second energy storage or a load connected to the second energy storage, the DC/DC converter having a first state converting a first DC voltage at the first terminals into a lower second DC voltage at the second terminals, and, a second state carrying out no conversion of a first DC voltage at the first terminals into a lower second DC voltage at the second terminals; and
   a control device for the DC/DC converter, which control device is configured to enable an energy supply at the second terminals by repeatedly changing the DC/DC converter back and forth between the first state and the second state,
   wherein the changing back and forth between the first state and the second state takes place at a frequency lower than 10 Hz.

2. The supply device as claimed in claim 1, further comprising a voltage controller configured to control the voltage at the second terminals to a predefined setpoint value, and wherein the predefined setpoint value is predefined for the voltage controller in the first state.

3. The supply device as claimed in claim 1, wherein the second terminals are connected to a second energy storage in the form of a rechargeable battery.

4. A supply device for a motor vehicle, said supply device comprising:
   a DC/DC converter including first terminals and second terminals, which first terminals are configured for electrical connection to a first energy storage or an energy source and which second terminals are configured for electrical connection to a second energy storage or a load connected to the second energy storage, the DC/DC converter having a first state converting a first DC voltage at the first terminals into a lower second DC voltage at the second terminals, and, a second state carrying out no conversion of a first DC voltage at the first terminals into a lower second DC voltage at the second terminals; and
   a control device for the DC/DC converter, which control device is configured to enable an energy supply at the second terminals by repeatedly changing the DC/DC converter back and forth between the first state and the second state,
   wherein the control device is configured, depending on an instantaneously required electrical power at the second terminals, to determine a ratio of a time duration of the first state and a time duration of the second state and to drive the DC/DC converter accordingly.

5. The supply device as claimed in claim 4, wherein the ratio of the time duration of the first state and the time duration of the second state is smaller in a case of a first instantaneously required electrical power than in a case of a second instantaneously required electrical power, which is higher than the first instantaneously required electrical power.

6. A supply device for a motor vehicle, said supply device comprising:
   a DC/DC converter including first terminals and second terminals, which first terminals are configured for electrical connection to a first energy storage or an energy source and which second terminals are configured for electrical connection to a second energy storage or a load connected to the second energy storage, the DC/DC converter having a first state converting a first DC voltage at the first terminals into a lower second DC voltage at the second terminals, and, a second state carrying out no conversion of a first DC voltage at the first terminals into a lower second DC voltage at the second terminals; and
   a control device for the DC/DC converter, which control device is configured to enable an energy supply at the second terminals by repeatedly changing the DC/DC converter back and forth between the first state and the second state,
   wherein the control device is configured, depending on an instantaneously required electrical power at the second terminals, to determine a suitable period duration for a period from first state and second state and to drive the DC/DC converter accordingly.

7. The supply device as claimed in claim 6, wherein a period duration for a period from the first state and the second state is smaller in the case of a first instantaneously required electrical power than in the case of a second instantaneously required electrical power, which is higher than the first instantaneously required electrical power.

8. The supply device as claimed in claim 4, wherein the instantaneously required electrical power is determined depending on a measurement of a current from the second energy storage to said load.

9. The supply device as claimed in claim 4, wherein the instantaneously required electrical power is determined depending on a voltage measurement at the second energy storage.

10. The supply device as claimed in claim 4, wherein the instantaneously required electrical power is determined depending on a state of charge of the second energy storage.

11. The supply device as claimed in claim 1, wherein the DC/DC converter in the first state for generating the second DC voltage operates with a clocking, the frequency of which is higher than a frequency of a switchover between the first state and the second state.

12. A motor vehicle comprising the supply device as claimed in claim 1.

* * * * *